US009114358B2

(12) United States Patent
Johnson et al.

(10) Patent No.: US 9,114,358 B2
(45) Date of Patent: Aug. 25, 2015

(54) ACID-IMPREGNATED ACTIVATED CARBON AND METHODS OF FORMING AND USING THE SAME

(75) Inventors: Richard L. Johnson, Vegreville (CA); R. Eugene Kuzub, Vegreville (CA); Jin Kwon Tak, Vegreville (CA)

(73) Assignee: Sulvaris Inc., Calgary, Alberta (CA)

( * ) Notice: Subject to any disclaimer, the term of this patent is extended or adjusted under 35 U.S.C. 154(b) by 427 days.

(21) Appl. No.: 13/365,877

(22) Filed: Feb. 3, 2012

(65) Prior Publication Data
US 2012/0137744 A1 Jun. 7, 2012

Related U.S. Application Data

(62) Division of application No. 11/844,123, filed on Aug. 23, 2007, now Pat. No. 8,198,211.

(51) Int. Cl.
| | |
|---|---|
| *C05C 3/00* | (2006.01) |
| *B01D 53/58* | (2006.01) |
| *B01D 53/86* | (2006.01) |
| *B01J 20/20* | (2006.01) |
| *C01B 31/12* | (2006.01) |
| *C05G 3/00* | (2006.01) |
| *B01J 20/30* | (2006.01) |
| *B01J 20/28* | (2006.01) |

(52) U.S. Cl.
CPC ............ *B01D 53/58* (2013.01); *B01D 53/8634* (2013.01); *B01J 20/20* (2013.01); *B01J 20/28016* (2013.01); *B01J 20/28057* (2013.01); *B01J 20/3007* (2013.01); *B01J 20/3021* (2013.01); *B01J 20/3028* (2013.01); *B01J 20/3085* (2013.01); *C01B 31/12* (2013.01); *C05C 3/00* (2013.01); *C05G 3/0047* (2013.01); *B01D 2251/50* (2013.01); *B01J 2220/4812* (2013.01); *B01J 2220/4875* (2013.01); *Y02E 50/343* (2013.01)

(58) Field of Classification Search
CPC .......... C05C 3/00; C05C 3/005; B01D 53/58; B01D 53/8634
USPC ...................................................... 502/417
See application file for complete search history.

(56) References Cited

U.S. PATENT DOCUMENTS

| | | | |
|---|---|---|---|
| 2,191,060 A | 2/1940 | Liebknecht | |
| 2,191,063 A | 2/1940 | Smit | |
| 2,382,334 A | 8/1945 | Riley et al. | |
| 3,259,501 A | 7/1966 | Ulrey | |
| 3,305,315 A | 2/1967 | Bacon et al. | |
| 3,969,268 A | 7/1976 | Fukuda et al. | |
| 3,998,756 A | 12/1976 | Sutherland | |
| 4,081,401 A | 3/1978 | Takegami et al. | |
| 4,081,403 A | 3/1978 | Takegami et al. | |
| 4,118,341 A | 10/1978 | Ishibashi et al. | |
| 4,259,302 A * | 3/1981 | Katz et al. | ...................... 423/237 |
| 4,290,895 A | 9/1981 | Iwamoto | |
| 4,292,285 A | 9/1981 | Nakao et al. | |
| 4,318,710 A | 3/1982 | Pilipski | |
| 4,425,256 A | 1/1984 | Pilipski | |
| 4,500,501 A * | 2/1985 | Hamada et al. | ............. 423/239.1 |
| 4,530,765 A | 7/1985 | Sabherwal | |
| 4,831,011 A | 5/1989 | Oikawa et al. | |
| 4,943,552 A | 7/1990 | Osajima et al. | |
| 5,102,855 A | 4/1992 | Greinke et al. | |
| 5,162,286 A | 11/1992 | MacDowall | |
| 5,234,884 A | 8/1993 | Mouri et al. | |
| 5,314,638 A | 5/1994 | Morine et al. | |
| 5,372,619 A | 12/1994 | Greinke et al. | |
| 5,391,534 A | 2/1995 | Carugati et al. | |
| 5,486,068 A | 1/1996 | Wilson | |
| 5,762,286 A | 6/1998 | Schultz | |
| 5,965,483 A | 10/1999 | Baker et al. | |
| 5,977,016 A | 11/1999 | Von Blucher et al. | |
| 6,030,922 A | 2/2000 | Khalili et al. | |
| 6,042,743 A | 3/2000 | Clemenson | |
| 6,225,256 B1 | 5/2001 | Shawabkeh et al. | |
| 6,296,821 B1 * | 10/2001 | Hendricks et al. | ............. 423/237 |
| 6,312,492 B1 | 11/2001 | Wilson | |
| 6,362,127 B1 | 3/2002 | Khalili et al. | |
| 6,429,171 B1 | 8/2002 | Clemenson | |
| 6,962,616 B1 | 11/2005 | Bandosz et al. | |
| 7,046,503 B2 | 5/2006 | Hinoki et al. | |
| 7,102,855 B2 | 9/2006 | Takakovic et al. | |
| 2007/0123420 A1 | 5/2007 | Hayashi et al. | |
| 2008/0047313 A1 | 2/2008 | Johnson et al. | |

FOREIGN PATENT DOCUMENTS

| | | |
|---|---|---|
| CA | 2175561 | 5/1995 |
| CA | 2164656 | 6/1996 |
| CA | 2502943 | 5/2004 |
| CN | 101565338 | 10/2009 |
| JP | 52063882 | 5/1977 |
| JP | 53001194 | 1/1978 |

(Continued)

OTHER PUBLICATIONS

Shin, Changsub et al.; Deordorization Technology at Industrial Facilities Using Impregnated Activated Carbon Fiber; Journal of Chemical Engineering of Japan; 2001; vol. 34, No. 3; pp. 401-406.

(Continued)

*Primary Examiner* — Stuart Hendrickson

(74) *Attorney, Agent, or Firm* — Bennett Jones LLP

(57) ABSTRACT

An acid-impregnated activated carbon matrix is formed from a carbonaceous material by the addition of a mineral acid, and may be used to chemisorb ammonia from a gas stream. The ammonia reacts with the acid to form a fertilizer salt. The spent matrix may be used as a fertilizer, or the fertilizer salt may be elutriated from the matrix.

11 Claims, 1 Drawing Sheet

(56) References Cited

FOREIGN PATENT DOCUMENTS

| | | |
|---|---|---|
| JP | 53014187 | 2/1978 |
| JP | 56095334 | 8/1981 |
| JP | 08-333110 A | 12/1996 |
| JP | 2003169841 | 6/2003 |
| KR | 2072743 | 9/2002 |
| RU | 2034782 C1 | 5/1995 |
| RU | 2160155 | 10/2000 |
| SU | 800134 | 1/1981 |
| WO | 2005053846 | 6/2005 |

OTHER PUBLICATIONS

Tarkovskaya, I.A.; Oxidized Carbon; Kiev, Naukova Dumka; 1991; pp. 5, 9 and 164.

Castro, J.B.; Phosphoric Acid Activation of Agricultural Residues and Bagasse from Sugar Cane: Influence of Experimental Conditions on Adsorption Characteristics of Activated Carbons; Industrial Engineering Chemistry Research; 2000; vol. 39 (11), the abstract.

Girgis, B.S. et al.; Activated Carbon from Cotton Stalks by Impregnation with Phosphoric Acid; Materials Letter; Apr. 1999; vol. 39, Issue 2; pp. 107-114; Elsevier Science B.V.

Keltsev, N.V.; Principles of Adsorption Technique; Moscow, Editorship Chemistry; 1976.

Guo et al. (2005), "Adsorption of NH3 onto activated carbon prepared from palm shells impregnated with H2SO4", Journal of Colloid and Interface Science, vol. 281, Issue 2, pp. 285-290.

Girgis et al. (1994), "Activated carbon from sugar cane bagasse by carbonization in the presence of inorganic acid", Journal of Chemical Technology and Biotechnology, vol. 61, No. 1, pp. 87-92.

Khalil et al. (2000), "Porosity characterization of activated carbon derived from olive oil wastes impregnated with H3PO4", Adsorption Science and Technology, vol. 18, No. 4, pp. 373-383.

Chou et al. (Nov. 29, 2006), "Regenerable adsorbent for removing ammonia evolved from anaerobic reaction of animal urine", Journal of Environmental Sciences, vol. 18, No. 6, pp. 1176-1181.

* cited by examiner

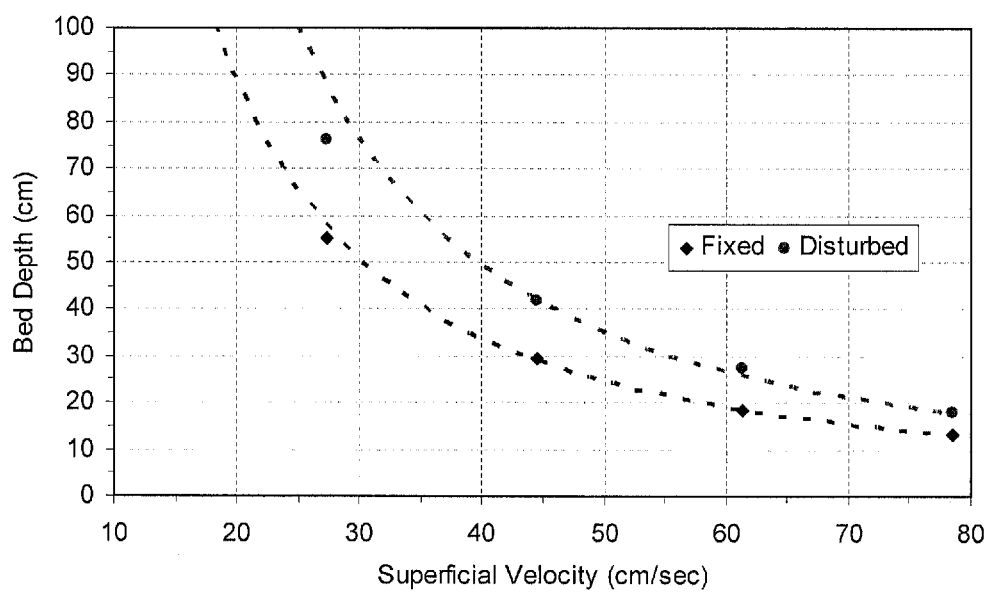

ACID-IMPREGNATED ACTIVATED CARBON AND METHODS OF FORMING AND USING THE SAME

CROSS REFERENCE TO RELATED APPLICATIONS

This application is a divisional of U.S. patent application Ser. No. 11/844,123 filed on Aug. 23, 2007 which claimed the priority benefit of U.S. Provisional Application No. 60/823,347 filed on Aug. 23, 2006 entitled "Preparation of Ammonia-Chemisorbent Carbonaceous Material Using Liquid Acid", the contents of both which are incorporated herein by reference.

FIELD OF THE INVENTION

The present invention relates to a composition comprising an activated carbon matrix impregnated with a mineral acid and methods of producing and using the same.

BACKGROUND OF THE INVENTION

Ammonia is an important chemical in industry and agriculture. It is used in the manufacture of many polymers and textiles, as well as being the essential foundation of nitrogen fertilizers.

Ammonia found in air or water may originate from the decomposition of urea, proteins, and other nitrogenous organic substances, or from the accidental escape of ammonia during its use in industry or agriculture. Ammonia in air is toxic to humans and animals at concentrations of 25 to 500 parts per million, depending on the acceptable exposure time. At any concentration, ammonia in air combines with acidic components, such as sulphur dioxide, to form particulate matter less than 2.5 um diameter ($PM_{2.5}$), which is a particularly noxious pollutant that can penetrate deep inside the human respiratory tract. In addition, airborne ammonia causes corrosion of metal structures and is considered to be a major contributor to odour problems.

Ammonia is highly soluble in water, where it can cause fish mortality at high concentrations and contribute to eutrophication and a depletion of oxygen by stimulating the growth of algal populations.

Ammonia may be removed from air by several methods. First, and most inexpensively, ammonia-laden air is diluted with air of low ammonia concentrations so that acceptable levels are achieved. However, this "dilution" approach distributes ammonia over a wider area and thus contributes to the formation of $PM_{2.5}$. In confined livestock operations, where toxic levels of ammonia build up as a result of animal urine deposition, inside air is expelled and outside air is brought in as "make-up air". However, under cold climate conditions, the removal of ammonia-laden air requires heating of replacement air to keep even temperatures inside the barn.

Another option is to remove ammonia from air by bubbling it through water, thereby trapping the ammonia as aqueous ammonia and ammonium ion ($NH_4^+$). However, as ammonium levels increase, the pH of the water increases and ammonia is released into the air again. Furthermore, dilute ammoniated water is not valuable and must be disposed of as well. A third option, and perhaps the most common of all, is to bubble ammonia-laden air through mineral acids, such as sulphuric or hydrochloric or nitric acid. The ammonia is converted to the equivalent salt (ammonium sulphate, ammonium chloride or ammonium nitrate). The disadvantages of the third option are: (a) considerable back pressure develops as a result of bubbling air through liquids and (b) the salts that are formed are mixed with the liquid acid and are difficult to separate, thereby limiting the usefulness of the by-products.

Another option is to reduce ammonia to nitrogen gas ($N_2$) by electrochemical treatment, however, this method suffers from high operating costs and the requirement for complex processing equipment.

If ammonia must be removed from water, such as from wastewater that will be reintroduced to natural water bodies, the ammonia is stripped from the water into air, where it becomes an air-removal problem again. Therefore, all of the technologies discussed above for removing ammonia from air are equally applicable to treating ammonia in water.

Therefore, there is a need in the art for a activated carbon matrix that removes ammonia from air, which may mitigate some or all of the difficulties found in the prior art.

SUMMARY OF THE INVENTION

The present invention is directed to a novel composition comprising acid-impregnated activated carbon, which may be produced by converting carbonaceous material into an activated carbon matrix while infusing acid within the activated carbon matrix. In addition, the present invention may include a method of using acid-impregnated activated carbon to remove ammonia from gas streams, and to a method for producing a fertilizer material from the spent media. Further, the present invention may include a method for converting the acid-impregnated activated carbon matrix and the fertilizer salt impregnated by-product into activated carbon.

Thus, in one aspect, the invention may comprise a solid composition comprising an activated carbon matrix impregnated with a mineral acid, which may be useful for chemisorbing ammonia. In one embodiment, the mineral acid comprises one of sulphuric acid, hydrochloric acid, phosphoric acid or nitric acid. The solid composition preferably has a surface area of at least about 10 $m^2$/gram, more preferably at least about 30 $m^2$/gram, and most preferably at least about 500 $m^2$/gram.

In one embodiment, the activated carbon matrix is formed from a carbonaceous material by the addition of the mineral acid to the carbonaceous material, wherein the activated carbon matrix has a surface area of at least about 5 times that of the carbonaceous material, and preferably about 10 times, and more preferably about 100 times, and most preferably about 300 times the surface area of the carbonaceous material. The carbonaceous material comprises a biomass material comprising once living organisms or any materials formed from once living organisms, for example, wood, animal waste product, or peat moss.

In another aspect, the invention may comprise a method for producing an activated carbon matrix impregnated with mineral acid comprising the steps of:
 (a) if necessary, drying carbonaceous material to a suitable moisture content;
 (b) grinding carbonaceous material to a suitable particle size range; and
 (c) applying a mineral acid to the carbonaceous material while mixing both components.

In one embodiment, the carbonaceous material may comprise wood, animal waste product, or peat moss. The carbonaceous material may be pelletized prior to applying a mineral acid, or the activated carbon matrix impregnated with a mineral acid may be pelletized. In one embodiment, the activated carbon matrix impregnated with a mineral acid may be elutriated with water to wash out fertilizer salt after ammonia chemisorption.

In another aspect, the invention may comprise a method of chemisorbing ammonia from a gas stream comprising the step of passing the gas stream over or through a porous carbon matrix impregnated with a mineral acid. In one embodiment, the method may comprise the steps of:

(a) placing a porous carbon matrix impregnated with a mineral acid in a reactor; and (b) flowing an ammonia-containing gas through the reactor.

In one embodiment, the porous carbon matrix impregnated with a mineral acid is disturbed during gas flow and may be in pelletized or granular form.

In another aspect, the invention may comprise a method of converting acid-impregnated porous carbon matrix into a fertilizer product comprising the steps of:

1. converting acid in the porous carbon matrix to its corresponding salt by exposing the porous carbon matrix to ammonia gas; and
2. screening the porous carbon matrix to a desired particle size range or pelletizing the activated carbon matrix to achieve a desired particle size range.

In one embodiment, the method further comprises the step of elutriating the fertilizer product from the porous carbon matrix, leaving behind porous carbon matrix.

BRIEF DESCRIPTION OF THE DRAWINGS

The invention will now be described by way of an exemplary embodiment with reference to the accompanying simplified, diagrammatic, not-to-scale drawings. In the drawings:

FIG. 1 shows a graph showing the relationship of superficial velocity of the flowing gas to the required bed depth of activated carbon matrix to maintain a desired minimum pressure drop.

DETAILED DESCRIPTION OF THE INVENTION

The present invention relates to a solid porous media produced from carbonaceous materials that are impregnated with acid, and an apparatus for removing ammonia from a gas stream by flowing the gas through the solid porous media impregnated with acid, and a composition that is the by-product of reacting ammonia with the acid impregnated in the activated carbon matrix. When describing the present invention, the following terms have the following meanings, unless indicated otherwise. All terms not defined herein have their common art, recognized meanings.

To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

"Carbonaceous material" shall mean any biomass material, which includes recently or once living biological material such as plants, animals, algae, or micro-organisms, or any materials or residues formed from once living organisms. Carbonaceous materials may include, without limitation, wood and other lignocellulosic material, animal waste or byproducts such as digested or composted animal manure, agricultural byproducts, peat moss, straw, municipal solid waste, bedding materials containing manure, nut shells, coconut coir, and fossil fuels and fossil fuel byproducts such as coal and petroleum coke.

"Liquid acid" shall mean any inorganic acid including, but not limited to, sulphuric, phosphoric, nitric, or hydrochloric acid.

"Activated carbon" shall mean a solid microporous material with high surface area comprised primarily of elemental carbon and containing small amounts of other elements originally found in the carbonaceous materials from which the activated carbon was formed, which may include but are not limited to such elements as oxygen, hydrogen, nitrogen, sulphur, silicon, aluminum, iron, calcium, magnesium, sodium, and potassium.

"Activated carbon matrix" shall mean activated carbon in a solid form sufficiently porous to allow passage of gas through its interior spaces.

"Gas" shall mean any substance or combination of substances that exists in a gaseous state at standard temperature and pressure.

"Chemisorption" shall mean the attachment or adsorption of a gas molecule onto a solid or liquid surface and any reactions that might ensue between the gas molecule and the solid or liquid.

The inventors have found that carbonaceous materials will react with liquid acid to form an activated carbon matrix impregnated with the acid. This reaction may occur under ambient conditions.

In general terms, an acid-impregnated activated carbon matrix may be formed by:

1. if necessary, adjusting the moisture content of a carbonaceous material to the desired level;
2. adjusting the particle size of the carbonaceous material to the desired range;
3. applying liquid acid to the carbonaceous material; and
4. mixing the carbonaceous material and liquid acid until the chemical reaction is complete.

The carbonaceous material may comprise any suitable biomass material, including wood and other lignocellulosic material, animal waste or byproducts such as digested or composted animal manure, peat moss, straw, municipal solid waste, bedding materials containing manure, nut shells, coconut coir, coal and petroleum coke. Wood chips or shavings are a particularly preferred carbonaceous material.

The moisture content of the carbonaceous material depends on the feedstock and the particle size, and may have a range of about zero to 50% on a wet mass basis, preferably about 5 to 35% and more preferably about 15 to 25%. The carbonaceous material may be dried if the moisture content is higher than the desired level, or water may be added to the carbonaceous material to bring up the moisture level.

The carbonaceous material may be processed into particles of an appropriate size, depending on the intended application and the feedstock, by any suitable method, including for example, chopping, grinding, cutting or otherwise reducing the particle size. Additionally, if the feedstock consists of very small particles, the particles maybe agglomerated to create larger particles of a suitable size. The particle size of the carbonaceous material may have an average range of about 0.1 mm to 10 mm, preferably about 1 to 5 mm and more preferably about 3 mm.

The liquid acid may be any suitable mineral acid, such as sulphuric, phosphoric, hydrochloric, or nitric acid. The choice of acid will of course change the salt formed if the acid reacts with a chemisorbed molecule. Thus, if the material is being used to remove ammonia from a gas stream, then the use of sulphuric acid will result in the formation of ammonium sulphate.

The concentration of liquid acid used depends on the moisture content of the carbonaceous material, lower concentrations are suitable for lower moisture content, and may have a range of about 20 to 100%, preferably about 75 to 100% and more preferably 100% (where 100% is the concentrated form of the acid). The amount of liquid acid used depends in part on the particle size of the carbonaceous material and the concentration of the acid used, and may have a range of about 1 part acid to 1 part carbonaceous material (by weight) for smaller particles, to 10 parts acid to 1 part carbonaceous material for the largest (about 10 mm) particles. Preferably, the ratio of acid to carbonaceous material is about 2:1 to 5:1 and more preferably about 4:1 (by weight).

The carbonaceous material and the liquid acid are mixed until the reaction is substantially complete, which length of time depends on the moisture content, particle size, acid concentration and acid/feedstock ratio, but is typically between about 2 to 35 minutes, preferably about 5 to 25 minutes and more preferably about 15 minutes. In one embodiment, completion of the reaction may be monitored by temperature. As the reaction starts, the temperature typically rises to reach a maximum and falls as the reaction completes.

In one embodiment, the liquid acid is sprayed on the carbonaceous material as mixing proceeds. In another embodiment, the carbonaceous material is formed into pellets and then the liquid acid is applied to the pelletized form of carbonaceous material.

The acid converts the carbonaceous material into an activated carbon matrix, and excess acid impregnates itself onto the activated carbon matrix. Even though there are large amounts of acid impregnated in the carbon matrix, the product looks and behaves as a solid material. A solid matrix containing large amounts of a strong acid is scientifically and commercially important because gas can be flowed through porous activated carbon matrix more efficiently and inexpensively than through an equivalent amount of liquid.

In one embodiment, the conversion of the carbonaceous material to activated carbon, and the impregnation of acid, takes place in one step. Furthermore, the acid-impregnated activated carbon matrix does not require further processing prior to use as a chemisorbent. Thus, no heat treatment, washing or neutralization step, or subsequent gas sulfonation step is required or desired.

As a result, the acid-impregnated carbon matrix may be used as a chemisorbent material because of its microporosity and large surface area. Hence, any basic constituent in a gas which is flowed through the material can be more efficiently removed and converted into a solid by-product.

In one embodiment, the material may be used to remove ammonia from a gas stream. Ammonia reacts with inorganic acids to form the corresponding ammonium salt and will be retained by the solid material as the gas passes through.

A gas stream containing ammonia may be routed through a sealed reaction chamber comprising the acid-impregnated activated carbon matrix, either in solid, granular or pelletized form. The activated carbon matrix may comprise a fixed bed or may be disturbed by gas flow or by mechanical means, such as with a fluidized bed, or a pseudofluidized bed. Preferably, means are provided to periodically replenish or replace the activated carbon matrix.

The ammonia is chemisorbed by the acid-impregnated activated carbon matrix and converted to a fertilizer salt with little residual acidity and only small amounts of carbon and other elements. Thus, the spent activated carbon matrix is a useful source of selected nutrients for agriculture and horticultural applications. As such, the expense of ammonia removal is reduced and a value-added by-product is created.

The spent activated carbon matrix may be pelletized using conventional methods to form fertilizer pellets or otherwise processed into a useful agricultural or horticultural form. If pelletized or processed in granular form, the pellets may provide a slow-release mechanism for the ammonium salt fertilizer.

In one embodiment, the ammonium salt, such as ammonium sulphate, is elutriated from the activated carbon matrix with water. The ammonium sulphate solution can then be concentrated and formed as a fertilizer, leaving the activated carbon matrix.

EXAMPLES

The following examples are intended to illustrate but not limit the claimed invention.

Concentrated sulphuric acid was added to carbonaceous material in weight ratios varying from about 2.5:1 to about 4.5:1. The temperature of the material was monitored, and the final acid content of the material was recorded. The results are shown in Table 1 below.

TABLE 1

Final acid content and maximum temperature reached in activated carbon matrix after adding sulphuric acid to carbon source

| Ratio of Acid to Carbon Source | Max. temperature (° C.) | Final acid content (%) |
| --- | --- | --- |
| 2.5 | 166.0 | 71.0 |
| 3.0 | 155.0 | 74.0 |
| 3.5 | 125.0 | 80.2 |
| 4.0 | 96.5 | 78.9 |
| 4.5 | 86.0 | 82.6 |

It can also be seen from Table 1 that liquid acid not only transforms the carbonaceous material to activated carbon but results in the impregnation of acid in activated the carbon matrix. Depending on the ratio of liquid acid to carbonaceous material, as much as 82% by weight of the resulting activated carbon matrix is comprised of acid.

Furthermore, Table 1 shows that the maximum temperature of the reaction decreases as the ratio of acid to carbonaceous material increases. Although not shown in Table 1, none of the trials resulted in more than five percent loss in mass balance, that is, the sum of the loss of carbonaceous material and acid during the reaction to produce the solid product did not exceed five percent.

The extent of the reaction of several carbonaceous materials with sulphuric acid was quantified. The transformation of several carbonaceous materials into porous activated carbon matrix comprising activated carbon was demonstrated by a large change in surface area.

TABLE 2

Effect on surface area of adding concentrated sulphuric acid (2.5 parts) to carbonaceous materials (1 part).

| | Surface Area | |
| --- | --- | --- |
| | Before Treatment | After Treatment |
| Carbonaceous Material | $m^2/g$ | |
| Wood shavings | 2.07 | 630.89 |
| Animal biosolids[1] | 3.51 | 34.14 |
| Peat moss | 2.06 | 10.34 |

[1]Derived from anaerobic digestion

Reacting a carbonaceous material with a liquid acid leads to a large increase in surface area of the carbon matrix, especially of wood. The surface area of wood shavings prior to the reaction was approximately two square meters per gram; after the reaction the surface area increased to more than six hundred square meters per gram. This represents approximately a three-hundred fold increase in surface area. It should be noted that biosolids originating from the anaerobic digestion of cattle manure showed approximately a ten-fold increase in surface area as a consequence of treatment with sulphuric acid, while commercial peat moss showed approximately a five-fold increase in surface area from the same treatment.

It has been surprisingly found that any concentration of ammonia in a gas stream will be completely and rapidly chemisorbed by the acid-impregnated activated carbon matrix.

quickly (sixty one to one hundred and nine milliseconds) chemisorb all ammonia (approximately two thousand parts per million by volume) from a gas flowing at ten to seventeen centimeters per second. Our conclusion is that ammonia chemi sorption is very rapid and needs very little exposure to the mass of acid-impregnated activated carbon matrix to be completely removed. Table 4 shows that high gas temperatures (60° Celsius) do not affect the retention time needed to chemisorb ammonia, as long as the gas does not drop in temperature as it passes through the activated carbon matrix (all gas streams were saturated with moisture at their respective temperatures). It is also noteworthy that Table 3 and Table 4 show that the source of the carbonaceous material, whether it originates from wood shavings or biosolids from cattle

TABLE 3

Effect of carrier gas characteristics and NH₃ concentration of inlet gas on NH₃ adsorption

| | | Properties of Carrier Gas | | | | NH₃ Concentration | |
| --- | --- | --- | --- | --- | --- | --- | --- |
| Carbonaceous source of adsorbent | Bed Depth (cm) | Superficial Velocity (cm/s) | Temp (° C.) | R.H. [1] (%) | Moisture (%, v/v) | Inlet (ppm) | Outlet |
| Wood shavings | 3.2 | 46.7 | 22 | 45 | 1.18 | 95 | <1 |
| Wood shavings | 1.4 | 9.6 | 22 | 100 | 2.58 | 1,994 | <1 |
| Wood shavings | 1.0 | 11 | 60 | 100 | 20.32 | 1,767 | <1 |
| Wood shavings | 9.0 | 3.1 | 21 | 0 | 0.00 | 80,200 | <1 |
| Wood shavings | 9.0 | 3.1 | 21 | 100 | 2.43 | 80,200 | <1 |
| Wood shavings | 7.0 | 7.9 | 23 | 0 | 0.00 | 150,000 | <1 |
| Animal biosolids [2] | 1.3 | 9.7 | 23 | 100 | 2.74 | 1,986 | <1 |

[1] Relative Humidity
[2] Derived from anaerobic digestion

The results tabulated in Table 3 shows that ammonia in a gas stream, ranging from ninety five parts per million by volume to one hundred fifty thousand parts per million by volume, is chemisorbed by the activated carbon matrix so that outlet concentrations of ammonia are less than one part per million. Furthermore, Table 3 shows that varying temperature or relative humidity of the gas does not affect ammonia chemisorption, provided that a significant decrease in temperature does not occur.

In order to determine critical response variables, testing was conducted to determine the minimum bed depth and reaction time required to adsorb 100% of ammonia present in a gas stream.

manure, does not significantly affect the required retention time for ammonia chemisorption.

We determined by testing that the acid-impregnated activated carbon matrix, even when it has been converted to its fertilizer salt, will facilitate the flow of gas with minimum pressure drop even, and even when flow rates are high. The graph shown in FIG. 1 shows that for non-pelletized, acid-impregnated activated carbon matrix that has already been converted to its fertilizer salt by the chemisorption of ammonia, the pressure drop does not exceed one and a half kilopascals even with flow rates of eighty centimeters per second through ten centimeters of activated carbon matrix. It is also apparent in FIG. 1 that as the flow rate decreases, the depth of

TABLE 4

Effect of activated carbon matrix characteristics and gas temperature on critical response variables [1].

| | Gas Characteristics | | | | Critical Response Variables [1] | |
| --- | --- | --- | --- | --- | --- | --- |
| Carbonaceous Source of Adsorbent | NH₃ Inlet Concentration (ppmv) | Superficial Velocity (cm/s) | Temperature (° C.) | Relative Humidity (%) | Bed Depth (mm) | Reaction Time (msec) |
| Wood shavings | 1994 | 9.6 | 22 | 100 | 7 | 75 |
| Wood shavings | 1767 | 11 | 60 | 100 | 7 | 62 |
| Wood shavings | 1991 | 17 | 23 | 100 | 10 | 61 |
| Animal biosolids [2] | 1986 | 9.7 | 23 | 100 | 11 | 109 |

[1] Critical response variables are the minimum parameter values required to adsorb 100% of the NH₃
[2] Derived from anaerobic digestion Table 4 shows that only seven to eleven millimeters of acid-impregnated activated carbon matrix is needed to the activated carbon matrix bed can increase exponentially without causing a pressure drop of more than one and a half kiloPascals. Also, testing determined that, at the same gas flow rate, measured as superficial velocity, a disturbed bed—one that is periodically vibrated—causes less pressure drop than a "fixed" bed, that is, one that is not disturbed during testing.

The amount of ammonia adsorbed by acid-impregnated activated carbon matrix was measured by the ratio of ammonia adsorbed per unit mass of the activated carbon matrix. Table 6 shows that the acid-impregnated activated carbon matrix adsorbs between two hundred and two hundred and twenty three milligrams of ammonia per gram of activated carbon matrix, representing twenty to twenty three percent of ammonia by weight.

TABLE 6

Total $NH_3$ adsorbed (per gram activated carbon matrix) and bulk density of 'spent' acid-impregnated activated carbon matrix in relation to original particle size.

| Particle size (mm) | $NH_3$ Adsorbed (mg/g) | Bulk Density (kg/m$^3$) |
|---|---|---|
| <0.5 | 200 | 513 |
| 0.5-1.0 | 230 | 614 |
| 1.0-1.7 | 220 | 628 |
| 1.7-2.0 | 220 | 623 |
| 2.0-2.8 | 220 | 547 |
| 2.8-3.4 | 230 | 636 |
| 3.4-4.0 | 220 | 610 |
| >4.0 | 230 | 680 |

Table 6 also shows that the bulk density of the activated carbon matrix after chemiadsorption of ammonia increases to approximately five hundred to seven hundred kilograms per cubic meter.

Testing was conducted to determine the chemical composition of acid-impregnated activated carbon matrix after chemisorption of ammonia. The fully converted acid-impregnated media is termed "spent" activated carbon matrix. Table 7 shows the chemical composition of the spent activated carbon matrix after full chemisorption of ammonia has been completed. It can be seen from FIG. 7 that the fertilizer salt comprises eighty four percent by weight of the spent activated carbon matrix after completing ammonia chemisorption.

TABLE 7

Components in acid-impregnated activated carbon matrix after $NH_3$ adsorption completed.

| Components | Amount (%) |
|---|---|
| Ammonium sulphate | 84.0 |
| Elemental composition [1] | |
| Nitrogen | 18.0 |
| Sulphur | 11.2 |
| Carbon | 5.9 |
| Oxygen | 40.0 |
| Other | 4.3 |
| Residual acid | 0.6 |

[1] Includes elements in ammonium sulphate and residues from adsorbent matrix.

Furthermore, Table 7 shows that only six tenths of one percent of the original acid remains in the spent activated carbon matrix. The elemental composition of the spent activated carbon matrix is consistent with the large proportion of fertilizer salt, which is ammonium sulphate in the case of the experiment giving rise to the data presented in Table 7. The carbon content remaining from the original wood shavings or other carbonaceous materials is less than six percent by weight.

What is claimed is:

1. A method of chemisorbing ammonia from a gas stream comprising the steps of:
   (a) reacting liquid acid with a carbonaceous biomass material under ambient conditions to convert the biomass to a porous carbon matrix impregnated with the liquid acid, and without a heat treatment, washing or neutralization step;
   (b) flowing an ammonia-containing gas over or through the porous carbon matrix impregnated with a mineral acid in a reactor, such that the ammonia reacts with the mineral acid, to produce ammonium salt.

2. The method of claim 1 wherein the liquid acid comprises sulphuric acid, phosphoric acid, nitric acid or hydrochloric acid.

3. The method of claim 2 wherein the liquid acid comprises concentrated sulphuric acid.

4. The method of claim 1 wherein the porous carbon matrix impregnated with the mineral acid is disturbed during gas flow.

5. The method of claim 1 comprising the further step of pelletizing or granulating the porous carbon matrix impregnated with the mineral acid prior to chemisorption.

6. The method of claim 5 wherein the porous carbon matrix pellets or granules are disturbed during gas flow.

7. A method of producing a fertilizer product comprising the steps of:
   (a) reacting liquid acid with a carbonaceous biomass material under ambient conditions to convert the biomass to a porous carbon matrix impregnated with the liquid acid, and without a heat treatment, washing or neutralization step;
   (b) flowing an ammonia-containing gas over or through the porous carbon matrix impregnated with a mineral acid in a reactor, such that the ammonia reacts with the mineral acid, to produce an ammonium salt fertilizer.

8. The method of claim 7 further comprising the step of screening, pelletizing or granulating the porous carbon matrix to a desired particle size range.

9. The method of claim 7, further comprising the step of elutriating the ammonium salt fertilizer from the porous carbon matrix.

10. The method of claim 7 wherein the liquid acid comprises sulphuric acid, phosphoric acid, nitric acid or hydrochloric acid.

11. The method of claim 10 wherein the mineral acid comprises concentrated sulphuric acid.

* * * * *